Jan. 16, 1934.    G. H. GIBSON ET AL    1,943,890
METHOD OF AND APPARATUS FOR HEATING AND DEGASIFYING LIQUIDS
Filed Aug. 13, 1931    2 Sheets-Sheet 1.
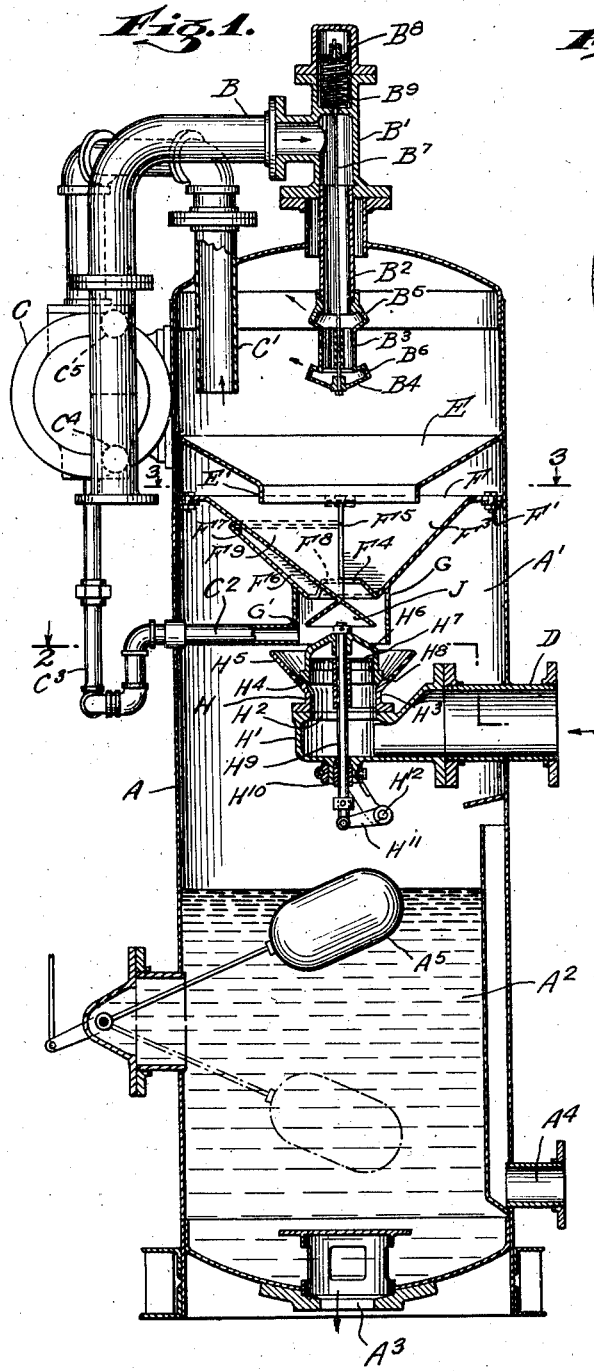
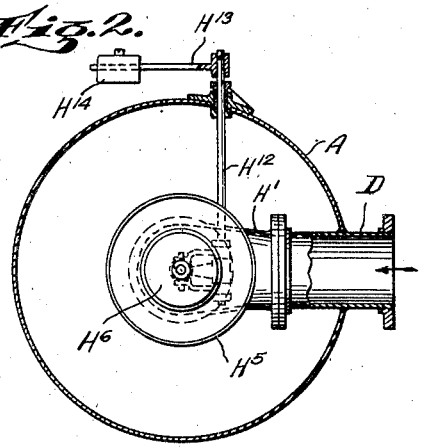
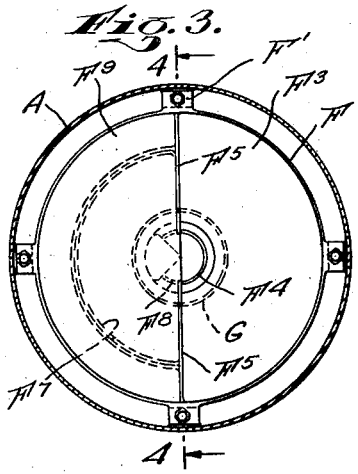
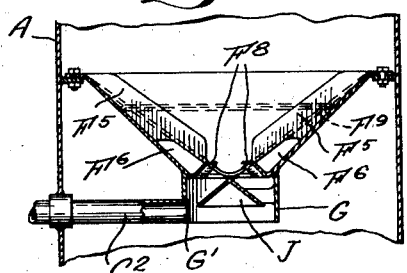
INVENTOR.
GEORGE H. GIBSON
VICTOR A. ROHLIN
BY John E. Hubbell
ATTORNEY Jan. 16, 1934. G. H. GIBSON ET AL 1,943,890
METHOD OF AND APPARATUS FOR HEATING AND DEGASIFYING LIQUIDS
Filed Aug. 13, 1931 2 Sheets-Sheet 2
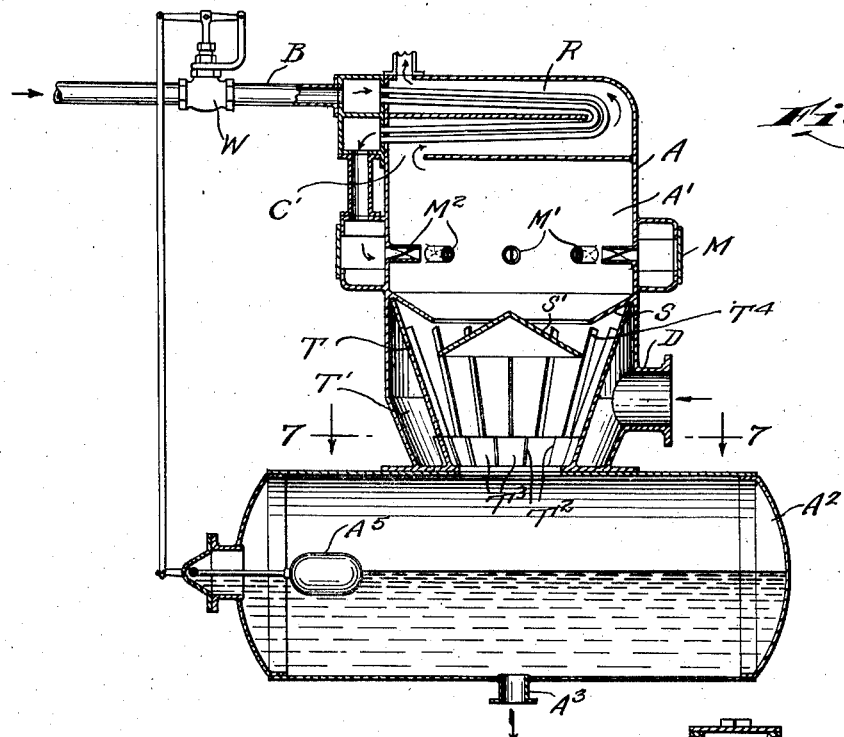
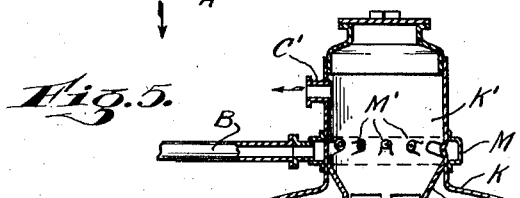
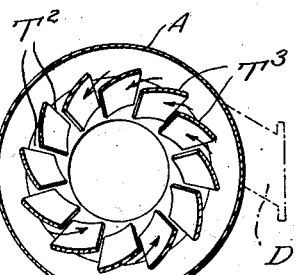
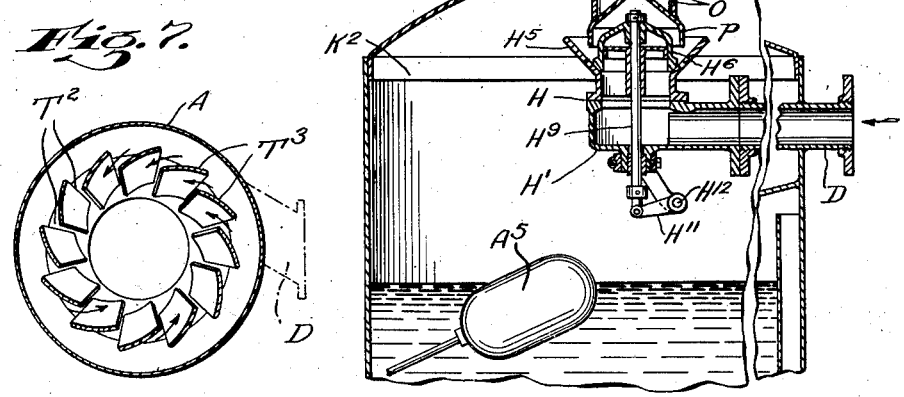
INVENTOR.
GEORGE H. GIBSON
VICTOR A. ROHLIN
BY John E. Hubbell
ATTORNEY Patented Jan. 16, 1934

1,943,890

UNITED STATES PATENT OFFICE 1,943,890

METHOD OF AND APPARATUS FOR HEATING AND DEGASIFYING LIQUIDS

George H. Gibson, Upper Montclair, N. J., and Victor A. Rohlin, Philadelphia, Pa., assignors to Cochrane Corporation, Philadelphia, Pa., a corporation of Pennsylvania Application August 13, 1931. Serial No. 556,738

17 Claims. (Cl. 261—115)

The present invention relates in general to improvements in methods of and apparatus for heating and degasifying liquids. The invention is particularly devised and adapted for use in heating and deaerating water to be used as boiler feed water or for other purposes requiring water practically free from oxygen.

In water heating and deaerating apparatus heretofore in use, it has been customary to employ banks of perforated or slotted trays arranged substantially horizontally in a deaerating space to retard the downflow of water therethrough and to break the downflowing water up into thin streams flowing over and through the trays and thereby increase the intimacy and thoroughness of contact of the water with the heating and deaerating steam introduced into the heater. While deaerating heaters of this type have usually proved to be effective deaerators, it has been found that for certain uses the treating process is disadvantageously affected by the lack of uniformity in the water distributing action of the trays. In particular, when the liquid to be passed down over the trays contains scale forming materials, such as calcium and magnesium salts, it is usually found that the scale forming and accumulating on the trays rapidly impairs their effectiveness. The effectiveness of a tray bank as a water distributing device has also been found to be quite low in marine installations in which the vessel containing the apparatus is subjected to rolling and/or pitching movements. The maintenance of a high tray bank efficiency is quite important as the tray bank section of a deaerating heater forms a substantial portion of the size, weight and cost of the apparatus, and particularly because inefficient action of some part of the tray bank may result in imperfect treatment of part of the water passing through the heater and consequent contamination of all of the water passing through the heater while those conditions exist.

It has been found that an ordinary jet type water heater in which water is heated by being sprayed into a steam filled chamber, will give partial deaeration of the water being heated, but not sufficient to permit its use where substantially complete deaeration is required. We have found that "zero oxygen" as indicated by the so-called "Winkler test" can be obtained by an improved arrangement and construction of the steam and water supply devices of a jet heater in combination with provisions for bringing the water after being heated to within two or three degrees of its desired final temperature and partially deaerated into intimate contact with the heating and deaerating steam while the latter is at a velocity sufficiently high to atomize the preheated and partially deaerated water brought into contact therewith whereby the water is brought to its final temperature and deaeration is completed. This process of heating and deaerating liquids and the apparatus devised for its performance form our present invention and have been found to be particularly effective for the fields of use mentioned above in which tray type deaerating heaters have proved inefficient and unsatisfactory.

The general object of our present invention is the provision of an improved method of and apparatus for heating and degasifying liquids, characterized by the manner of and the provisions for intimately mixing and agitating the liquid being treated with the heating and degasifying fluid. A further and more specific object is the provision of an improved method of and apparatus for heating and deaerating water in which the use of banks of trays is advantageously dispensed with, the capacity of the apparatus employed increased as compared to apparatus of the same size, weight and cost heretofore used for such purposes, and "zero oxygen" by the Winkler test is obtained.

The various features of novelty which characterize our invention are pointed out with particularity in the claims annexed to and forming a part of this specification. For a better understanding of the invention, however, and the advantages possessed by it reference should be had to the accompanying drawings and descriptive matter in which we have illustrated and described preferred embodiments of the invention.

Of the drawings:

Fig. 1 is an elevation with parts broken away and in section of a water heater and deaerator embodying our invention;

Fig. 2 is a horizontal section on the line 2—2 of Fig. 1;

Fig. 3 is a plan view of the lower distributing baffle shown in Fig. 1;

Fig. 4 is a vertical section on the line 4—4 of Fig. 3;

Fig. 5 is a somewhat diagrammatic partial view generally similar to Fig. 1 of a modification;

Fig. 6 is a view similar to Fig. 1 of a second modification; and

Fig. 7 is a section on the line 7—7 of Fig. 6.

In the embodiment of the invention illustrated in Figs. 1 to 4, we have illustrated a form of our improved apparatus which is primarily devised and adapted for use in heating and deaerating water in marine installations. In this construction the main water heating and the deaerating operations are performed in a chamber A' forming the upper section of a vertical tank or shell A, the lower section $A^2$ of which is utilized as a receiving or storage space for the treated water. A water supply conduit B, in which a vent condenser C of any suitable type is incorporated, is connected to the top of the tank A for the delivery of water thereto, and a steam supply pipe D opens through one side thereof substantially below the discharge end of the water delivery provisions hereinafter described. An outlet $A^3$ is provided in the bottom of the storage section $A^2$ for the discharge of the heated and deaerated water to the apparatus in which the treated water is to be utilized. The maximum water level in the storage space is limited by an overflow outlet connection $A^4$ opening to the tank at a predetermined level. The storage space is also provided with the usual control float $A^5$ arranged to control the operation of a valve W (not shown in Fig. 1) in the water supply pipe B in accordance with the level of the water in the storage space.

The water supply conduit B terminates at its tank in a device for spraying the water into the chamber A' in a finely divided form. In the construction shown, the spray provisions are preferably of the loaded multiple spray type described and claimed in the pending application of Arthur E. Kittredge, Serial No. 674,885, filed December 19, 1932. As shown, the spray head consists of a T B' connecting the pipe B to a vertically elongated casing $B^2$ forming the body of the spray head and cooperating at its lower discharge end with a plurality of axially movable nozzle parts $B^3$ and $B^4$ formed and arranged to provide a plurality of axially spaced peripheral discharge slots $B^5$ and $B^6$ when the parts $B^3$ and $B^4$ are spaced from one another and from the end of the casing $B^2$ under the action of the hydraulic pressures present when the apparatus is in operation. The nozzle part $B^3$ is a spool-shaped ring as shown and formed at its upper and lower ends with annular discharge lips which cooperate with similar surfaces on the disc shaped part $B^4$ and casing $B^2$ to form the discharge slots. The nozzle parts are advantageously proportioned and formed to provide in operation an equal division of the water supply between the several discharge slots.

A high velocity of discharge through the slots is secured by loading the movable discharge slot-forming parts. Suitable loading means are illustrated in Fig. 1 and comprise a rod $B^7$ extending upwardly from the disc $B^4$ and carrying an adjustable abutment $B^8$ at its upper end, against which a coil spring $B^9$ under compression continuously acts to oppose any tendency of the nozzle parts $B^3$ and $B^4$ to be spaced apart. The discharge slot $B^5$ and $B^6$ are advantageously arranged with diverging paths of discharge, the slot $B^5$ discharging at a greater angle to the horizontal than the slot $B^6$ as indicated by the arrows in Fig. 1, with the discharge points preferably axially spaced sufficiently to avoid evacuation of the space intermediate the diverging conical jets. With the described spray provisions in normal operation, the space in the upper section of the tank A will be substantially completely filled with water in a finely divided form.

Below the spray head is arranged a downwardly converging horizontally positioned water distributing baffle E, having its peripheral upper edge conforming to and secured to the walls of the tank A. The baffle is shown of frusto-conical form with a short vertical flange E' depending from its open lower end.

A second downwardly converging distributing baffle F is advantageously arranged below the baffle E, the upper edge of the baffle F being at substantially the same level as the lower edge of the flange E' and spaced and supported from the walls of the tank by angularly spaced lugs F''. The baffle F is also preferably of general frusto-conical form and when the apparatus is intended for use where the supporting base may be subjected to severe tilting movements, such as occur in marine installations, the baffle F is constructed in the special manner hereinafter described.

Steam is supplied to the tank A in accordance with the amount and temperature of the water discharged by the spray head, through the steam supply pipe D and a loaded valve H at the discharge end of the pipe D. The valve H is preferably arranged directly below the discharge end of the baffle F and consists of a body member H' connected to the pipe D and formed with a port $H^2$ in its upper side. A combined dashpot and valve seat member $H^3$ is arranged with its lower end mounted on the valve body and registering with the port $H^2$ and formed with an inclined valve seat $H^4$ on the lower end of an upwardly diverging collecting baffle member $H^5$ in axial alignment with the baffles E and F and advantageously slightly larger at its upper end than the adjacent portion of the baffle F. A dome-shaped valve closure member $H^6$ seats on the valve seat $H^4$ and operates to open and close the port $H^2$ when raised and lowered, respectively. A stationary plunger $H^7$ secured to the member $H^3$ extends within the closure member $H^6$ in contact with the inner walls thereof. The dashpot arrangement so obtained effectively prevents the valve H from being seriously affected by sudden surges in pressure in the steam pipe D or tank chamber A'. Water descending from the baffle F falls onto the conical upper surface of the valve closure member $H^6$ and into the collecting cone $H^5$, flowing down the inner side of the latter towards the peripheral discharge slot formed between the valve member $H^6$ and valve seat, when the steam pressure in the supply pipe causes the valve H to open. Any tendency for an accumulation of water in the cone $H^5$ is prevented by the disposition of drainage ports $H^8$ therein adjacent the valve seat $H^4$.

A high velocity steam discharge into the chamber A' is effected by loading the valve H sufficiently to cause a pressure drop therethrough of an amount sufficient to obtain the desired discharge velocity. In the present valve construction, the valve rod $H^9$ passes through a stuffing box $H^{10}$ in the valve body and is pivotally connected to a crank $H^{11}$ mounted on a shaft $H^{12}$. The latter extends through the wall of the tank A and at its projecting end carries a lever $H^{13}$ and adjustable weight $H^{14}$.

The vent condenser C receives a mixture of steam, air and other gases passing from the chamber A' by means of a pipe C' opening into the upper part of the chamber. The water to be treated is circulated therethrough by inlet and outlet connections $C^4$ and $C^5$, respectively. The air and other gases not condensed by the water passing through the condenser are vented to the atmosphere, and the condensate formed in the condenser is returned to the heater through a pipe $C^2$ opening into the interior of the distributing baffle structure. A water seal between the condenser gas space and heater is formed by a bend $C^3$ in the pipe $C^2$.

With the deaerating heater constructed as described, water containing air and other undesirable gases is delivered to the spray nozzle in regulated quantities at a temperature of 40° F. or higher. The water leaves the spring loaded nozzle at a substantial velocity and in a plurality of diverging conical streams, which create an atmosphere of finely divided water descending through the upper portion of the chamber $A'$. The descending water comes into contact with the steam and atomized water mixture ascending through and around the baffle F and through the baffle E and the contact of the fluids is sufficiently prolonged and intimate in that portion of the heater to heat the water to a temperature within a few degrees of that of the steam and to separate a substantial portion of the undesirable gaseous constituents of the descending water. The separated gases and uncondensed steam pass off through the vent pipe $C'$. The partially heated and deaerated water continues its descent through the chamber $A'$, flowing down over the baffles E and F and from the lower end of the latter into the collecting cone $H^5$. The symmetrical form and arrangement of these flow directing parts tends to maintain a uniform flow through all portions of the heater.

With the apparatus in its normal vertical position shown, the flow from the baffle F will be equally received on all portions of the cone $H^5$ and the thin streams of water flowing down the inner sides of the latter come into contact with the high velocity steam discharged along the surface of the cone from the valve H, causing the downflowing water to be atomized and driven outwardly and upwardly into the chamber. The atomization of the water raises its temperature to that of the steam and the violent agitation to which the water is thus subjected permits the remaining undesirable gaseous constituents entrained in the water to easily separate and be carried along with the uncondensed portions of the steam into the upper portion of the chamber $A'$. The water, which is now completely heated and deaerated, drops into the water storage space of the heater, from which it is removed as needed.

Apparatus for the purpose described when intended for marine installations must be capable of maintaining its normal operating efficiency when subjected to a roll of 22° to either side of its normal vertical position. This condition has been found practically impossible of attainment with water heating and deaerating apparatus of the types heretofore in use, but is easily attainable with our apparatus heretofore described when the distributing baffle F has the special construction shown in Figs. 1, 3 and 4. The operating difficulties are mainly due to the difficulty in maintaining a uniform flow of the descending water. For example, if the heater is tilted to the right about 20°, most of the water at that angle will fall onto and be discharged from the right half of the baffle F, when the latter is similar in form to the baffle E. This would result in the delivery of most of the water to the right side of the collecting cone $H^5$, which being at that time lower than the left hand side, cannot cause the water to be uniformly subjected to the atomizing action. The effectiveness of the atomizing action would be largely decreased and much of the water would not be atomized. The quality of the deaeration would rapidly drop and the water discharged from the apparatus would not show "zero oxygen" by the Winkler test.

When the present apparatus is intended for marine use the distributing baffle F which converges toward the normally vertical axis of the steam spray discharged by the spray valve H, and collects the downcoming water sprayed into the upper portion of the steam space, has associated with it special provisions for restricting movement of the downcoming water circumferentially about said axis and for passing the water into a portion of the path of said steam spray which is suitably distributed about said axis. To this end in the particular arrangement illustrated in the accompanying drawings the baffle F is constructed so that the water falling on the right hand half of the baffle will be delivered to the left hand side of the collecting cone $H^5$, and vice versa. This mode of operation is attained by constructing the distributing baffle F in two halves connected together to form a perfect circle at their tops. The right hand half consists of a semi-frusto-conical baffle $F^3$ terminating at its lower end in an upwardly inclined flange $F^4$, which forms a gutter for the water flowing down the baffle $F^3$. A pair of vertical flanges $F^5$ are mounted along the diametrical edges of the baffle $F^3$ and provided with openings $F^6$ at their lower ends to permit the water flowing along the gutter to pass to the left hand half of the baffle F. The left hand baffle half includes a semi-frusto-conical baffle $F^7$ shorter than but having substantially the same inclination as the baffle section $F^3$. Angularly spaced portions of the lower end of the baffle $F^7$ are formed with gutters by uprising flanges $F^8$ which form continuations of the baffle $F^4$ at the opposite side of the vertical flanges $F^5$. Water can thus flow along the gutter on the right hand side in either direction into the corresponding gutter on the left hand side, from which it flows over the edges of the flangeless baffle portion above the left hand side of the collecting cone $H^5$.

To secure the proper distribution to the right hand half of the collecting cone $H^5$, the left side of the baffle structure F is formed with an upper semi-conical baffle $F^9$, the upper periphery of which is connected to the shell wall and the lower converging portion extends over the upper edges of the flanges $F^8$ and through the discharge end of the baffle $F^7$. The side edges of the baffle $F^9$ are connected to the diametrical flanges $F^5$. Any water falling on the baffle $F^9$ will flow down the same and over its lower end onto the right side of the collecting cone.

To confine the flow of the downflowing water to the collecting cone and to secure a uniform distribution to the same, a downtake tube G of slightly smaller dimensions than the upper end of the collecting cone is secured to and surrounds the discharge end of the baffle structure F. Within the tube G is mounted a small upright distributing cone J with its apex contacting with the apex of the semi-cone $F^9$ and its lower edge spaced from the surrounding wall of the tube G. The water from the baffle $F^9$ flows down over the right hand surface of the cone J and onto the collecting cone. The left hand surface of the cone J receives all the water falling on the baffle $F^3$. As shown in Fig. 4, the tube G has a cut out $G'$ in its lower edge for receiving the condenser drain pipe $C^2$, the drain pipe discharging into the collector cone. The various baffle surfaces are smooth and offer no resistance to the flow of the water. The baffle structure F can be easily removed or installed as a unit through one of the access doors of the heater.

With the above arrangement, substantially equal distribution of the water will be obtained in all positions to which the tank is liable to be tilted while in operation. For example, if the tank were tilted to the right, the greater portion of the water which would ordinarily fall on the right hand side of the baffle F and subsequently be delivered to the same side of the collecting cone, will with the present baffle structure flow down the surfaces of the baffles $F^3$ and $F^7$ and onto the left hand side of the collecting cone, which in that position of the tank, will be the high side of the cone. The delivery of the major portion of the water to the high side of the collecting cone provides a substantially uniform distribution of water over the cone as the water on the high side flows rapidly towards the low side. The descending water can therefore be subjected to the same vigorous atomizing action irrespective of the position of the tank.

In Figs. 5–7, we have illustrated modified forms of apparatus for performing the method of water heating and deaeration heretofore described. In Fig. 5, the tank K is formed with an upper chamber section $K'$ of restricted volume and a lower section $K^2$ of substantial volume. The water to be treated is delivered to the chamber section $K'$ through a ring manifold M built into the tank structure and provided at its inner side with a series of radially arranged upwardly inclined jet nozzles $M'$, each having a small diametral septum $M^2$ of helical form in its discharge end, the water being discharged at a relatively high velocity and in a whirling jet into the path of the ascending mixture of steam, water and air. The entering water is partly deaerated and heated to within a few degrees of the steam temperature by the spray action and the intimate contact with the heated mixture.

The water after being subjected to the foregoing effects is conducted by the distributing baffle N onto a conical hood P, suspended from the baffle N by straps O. The water flowing down over the edges of the hood P is heated and atomized by high velocity steam issuing from the steam valve H, which as shown is identical in construction and mode of operation with the valve H of the construction shown in Figs. 1–4. The water is atomized outwardly in a relatively large volume and any gaseous constituents remaining in the water are separated out by the atomizing action. The separated gases and steam are drawn upwardly through the water spray in the chamber $K'$ to the off-take pipe $C'$ leading to a vent condenser (not shown) where the heat in the vented gases is transferred to the water flowing to the manifold M.

The constructions shown in Figs. 1–5 are particularly adapted for marine use. Restricted water passages are avoided, permitting their use with liquids having a high scale-forming matter content, and no backflow of water is possible through the steam supply pipe on an abnormal increase in pressure in the heater because of the check valve type of steam inlet valve used. Since the amount of steam supplied for atomizing and heating purposes is largely dependent upon the quantity of water under treatment and the temperature range through which it is to be heated, the opening of the steam valve must be adjusted to vary in accordance with the amount of steam to be supplied to the apparatus, in order to hold the same pressure drop and velocity for a small amount of steam as for a greater. The heater capacity is large and the cost and weight of the same is substantially less than for prior constructions having a similar capacity.

In the construction shown in Figs. 6 and 7, the water to be treated is admitted to a manifold M in the same manner as in Fig. 5, while the vent condenser R is built into the steam dome instead of being separate. The jet nozzles $M'$ are constructed and arranged in the same manner as in Fig. 5. The water supply pipe B leads to the vent condenser R wherein the water is heated by the gases entering the condenser through the off-take $C'$. The partially heated water is discharged in whirling high velocity jets by the nozzles $M'$ into contact with the mixture passing to the vent condenser and the water is almost completely heated and partially deaerated by this action. The descending water is collected by the baffle S and forced towards the sides of the heater by the distributing baffle $S'$ and on passing over the lower edges of the latter is collected by a frusto-conical baffle T forming the inner wall of a steam inlet manifold $T'$. At the lower end of the baffle T are arranged a series of tangential steam inlet ports $T^2$ formed by blades $T^3$, as shown in Fig. 7, and between which the steam from the supply pipe D enters the deaerating space of the heater. The aggregate area of the ports $T^2$ is advantageously less than the area of the steam inlet D. The inner surface of the baffle T is preferably provided with a series of radial ribs $T^4$, leading from the upper end of the baffle down to the ports $T^2$. In operation, the ribs prevent water from moving from one side of the baffle to the other whenever the heater is in an inclined position, as, for example, would occur when the heater is used in a ship.

The water to be heated is partially heated and deaerated after being introduced in the described manner and in the mass of steam, air and water whirling at a high velocity below the baffle $S'$, the heating and deaeration is completed. The treated water drops into the water storage section $A^2$ of the heater, from which it is drawn as required to satisfy the demand.

While in accordance with the provisions of the statutes, we have illustrated and described the best forms of embodiment of our invention now known to us, it will be apparent to those skilled in the art that changes may be made in the process and apparatus disclosed without departing from the spirit of our invention as set forth in the appended claims and that in some cases certain features of our invention may be used to advantage without a corresponding use of other features.

What we claim is:—

1. The method of heating and deaerating water which comprises passing water to be treated in a finely divided form into a steam chamber, heating the water while in said chamber to approximately the steam temperature and liberating a portion of the entrained gases by contact with steam supplied at a relatively high velocity to said chamber at a point below the point of introduction of the water, and completing the heating and deaerating treatment by bringing the partially heated and deaerated water into intimate contact with the steam while the latter is moving in a direction transverse to the direction of movement of the water so brought into contact with the steam, and while the steam velocity is sufficiently high to atomize the water and release substantially all of the remaining gases in solution.

2. The method of heating and deaerating water which comprises spraying water to be treated into a steam chamber, heating the water while passing downwardly through said chamber to approximately the steam temperature and liberating a portion of the entrained gases by direct contact with steam supplied at a relatively high velocity to said chamber at a point below the point of introduction of the water, and completing the heating and deaerating treatment by bringing the partially heated and deaerated water into intimate contact with the steam while the latter is moving in a direction transverse to the direction of movement of the water so brought into contact with the steam, and while the steam velocity is substantially at its maximum to finely atomize the water and release substantially all of the remaining gases in solution.

3. The method of heating and deaerating water which comprises spraying water to be treated in a finely divided form into a steam chamber, heating the water while passing through said chamber to approximately the steam temperature and liberating a portion of the entrained gases by contact with an ascending mixture of air and steam, supplying steam at a relatively high velocity to said chamber at a point below the point of introduction of the water, completing the heating and deaerating treatment by bringing the partially heated and deaerated water into intimate contact with the steam at its point of introduction and while the latter is moving in a direction transverse to the direction of movement of the water so brought into contact with the steam, and while the steam velocity is at its maximum to finely atomize the water and release substantially all of the remaining air in solution, and withdrawing the uncondensed steam and separated gases from the upper portion of said chamber.

4. Water heating and deaerating apparatus comprising in combination, a container having a steam space, means for passing the water to be treated into said space in a finely divided form, means for discharging steam at a relatively high velocity into said space below the point of introduction of the water and with a substantial component of flow, and means for directing the downflowing water in said space into contact with the steam at a point where the steam velocity is sufficient to atomize the water.

5. Water heating and deaerating apparatus comprising in combination, a container having a steam space, means for passing the water to be treated into said space in a finely divided form, valve means for discharging steam at a relatively high velocity into said space below the point of introduction of the water, and means for directing the downflowing water in said space into contact with the steam at a point where the steam velocity is sufficient to atomize the water.

6. Water heating and deaerating apparatus comprising in combination, a container having a substantially unobstructed steam space, means for passing the water to be treated into and through said space in a finely divided form, means in the path of flow of the downflowing water for discharging steam at a relatively high velocity into said space substantially below the point of introduction of the water and in a direction transverse to the direction of water downflow, and means for directing substantially all of the downflowing water in said space into contact with the steam adjacent to the point of steam discharge.

7. Water heating and deaerating apparatus comprising in combination, a container having a substantially unobstructed steam space in its upper portion and a lower water storage space, a spray device in the upper portion of said steam space for discharging water to be treated in a finely divided form into said steam space, a steam supply connection to the lower portion of said steam space, a steam discharge valve receiving steam from said supply connection and having a peripheral discharge opening to said steam space, and a collecting member arranged to conduct downflowing water into position to be atomized by said steam.

8. Water heating and deaerating apparatus comprising in combination, a container having a substantially unobstructed steam space in its upper portion and a lower water storage space, a spray device in the upper portion of said steam space for discharging water to be treated in a finely-divided form into said steam space, a steam supply connection to the lower portion of said steam space, a steam discharge valve arranged to receive steam from said supply connection and having a peripheral discharge opening to said steam space, a collecting member associated with said steam valve and arranged to conduct downflowing water into position to be atomized by said steam, and a converging baffle positioned between said spray device and said collecting member and arranged to direct the downflowing water onto said collecting member.

9. Water heating and deaerating apparatus comprising in combination, a container having a substantially unobstructed steam space in its upper portion and a lower water storage space, a multiple spray device in the upper portion of said steam space for discharging water to be treated in a finely divided form into said steam space, a steam supply connection to the lower portion of said steam space, a loaded steam discharge valve arranged to receive steam from said supply connection and having a peripheral discharge opening to said steam space, a collecting member associated with said steam valve and arranged to conduct downflowing water into position to be atomized by the steam discharged through said valve, and a converging baffle positioned between said spray device and said collecting member and arranged to direct the downflowing water onto said collecting member.

10. Water heating and deaerating apparatus comprising in combination, a container having a steam space in its upper portion and a lower water storage space, a spray device in the upper portion of said steam space for discharging water to be treated in a finely divided form into said steam space, a steam supply connection to the lower portion of said steam space, a steam discharge valve arranged to receive steam from said supply connection and to deliver steam at a relatively high velocity through an annular opening to said steam space, an inverted frusto-conical collecting member associated with said steam valve and arranged to conduct downflowing water into position to be atomized by the steam discharged through said annular opening, and an inverted frusto-conical baffle positioned between said spray device and said collecting member and arranged to direct the downflowing water uniformly onto said collecting member.

11. Water heating and deaerating apparatus comprising in combination, a container having a steam space in its upper portion and a lower water storage space, a multiple spray device in the upper portion of said steam space for discharging water to be treated at a relatively high velocity and in a finely divided form into said steam space, a steam supply connection to said container, a loaded steam discharge valve arranged to receive steam from said supply connection and to deliver steam at a relatively high velocity to said steam space, baffle means arranged to conduct downflowing water into position to be atomized by the steam discharged through said valve, a vent condenser arranged to receive steam and separated gases from said chamber, and means for returning condensate from said vent condenser to said baffle means.

12. Water heating and deaerating apparatus comprising in combination, a container having a steam space in its upper portion, a spray device in the upper portion of said steam space for discharging water to be treated in a finely divided form into said steam space, a steam supply connection to the lower portion of said steam space, a steam discharge valve arranged to receive steam from said supply connection and to deliver steam at a relatively high velocity through an annular opening to said steam space, an inverted frusto-conical collecting member having its lower end adjacent said annular opening and arranged to conduct downflowing water into position to be atomized by the steam discharged through said annular opening, and a hood member forming a dashpot for said valve and arranged to direct water falling thereon onto said collecting member.

13. Water heating and deaerating apparatus comprising in combination, a container having a steam space in its upper portion, a spray device in the upper portion of said steam space for discharging water to be treated in a finely divided form into said steam space, a steam supply connection to the lower portion of said steam space, a steam discharge valve arranged to receive steam from said supply connection and to deliver steam at a relatively high velocity through an annular opening to said steam space, an inverted frusto-conical collecting member associated with said steam valve and arranged to conduct downflowing water into position to be atomized by the steam discharged through said annular opening, and baffle means positioned between said spray device and said collecting member and arranged to direct the downflowing water falling on one side thereof onto the opposite side of said collecting member.

14. Water heating and deaerating apparatus comprising in combination, a container having a steam space in its upper portion and a lower water storage space, a multiple spray device in the upper portion of said steam space for discharging water to be treated in a finely divided form into said steam space, a steam supply connection to the lower portion of said steam space, means arranged to receive steam from said supply connection and to deliver steam at a relatively high velocity through a plurality of tangential openings, and a baffle arranged to conduct downflowing water into position to be atomized by the steam discharged through said tangential openings.

15. Water heating and deaerating apparatus comprising in combination, a container having a steam space, means for discharging water to be treated in a finely divided form into said steam space, means for discharging steam into said steam space at a relatively high velocity, a circular collecting member associated with said steam discharge means and arranged to conduct downflowing water into position to be atomized by the discharged steam, and circular baffle means positioned between said water discharge means and said steam discharge means and formed to deliver water falling on either side thereof to the opposite side of said collecting member.

16. In water and steam contact apparatus, a container enclosing an upper steam space and a lower water storage space, means for spraying water in finely divided form into the upper portion of said steam space, means for discharging steam into the lower portion of said steam space in the form of a spray distributed about and directed away from a vertically disposed axis of discharge and means for collecting the downcoming water and passing it in portions distributed about said axis into the path of said steam spray and for restricting the movement of the downcoming water circumferentially about said axis.

17. In water and steam contact apparatus, a container enclosing an upper steam space and a lower water storage space, means for spraying water in finely divided form into the upper portion of said steam space, means for discharging steam into the lower portion of said steam space in the form of a spray distributed about and directed away from a vertically disposed axis of discharge, a converging baffle surrounding said axis for collecting the downcoming water and passing it in portions distributed about said axis into the path of said steam spray, and baffle parts above said baffle extending radially of said axis and restricting movement of the downcoming water circumferentially about said axis.

GEORGE H. GIBSON.
VICTOR A. ROHLIN.

CERTIFICATE OF CORRECTION.

Patent No. 1,943,890. January 16, 1934.

GEORGE H. GIBSON, ET AL.

It is hereby certified that error appears in the printed specification of the above numbered patent requiring correction as follows: Page 5, first column, line 53, claim 4, after the word "substantial" insert horizontal; and that the said Letters Patent should be read with this correction therein that the same may conform to the record of the case in the Patent Office.

Signed and sealed this 5th day of September, A. D. 1939.

(Seal)

Henry Van Arsdale,
Acting Commissioner of Patents.